United States Patent
Tamura et al.

(10) Patent No.: US 10,668,803 B2
(45) Date of Patent: Jun. 2, 2020

(54) IN-WHEEL MOTOR DRIVE DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/081,453

(22) PCT Filed: Nov. 7, 2016

(86) PCT No.: PCT/JP2016/082962
§ 371 (c)(1),
(2) Date: Aug. 31, 2018

(87) PCT Pub. No.: WO2017/163480
PCT Pub. Date: Sep. 28, 2017

(65) Prior Publication Data
US 2019/0084405 A1    Mar. 21, 2019

(30) Foreign Application Priority Data

Mar. 22, 2016 (JP) ................................ 2016-057455
Oct. 14, 2016 (JP) ................................ 2016-202514

(51) Int. Cl.
*B60K 7/00* (2006.01)
*B60B 27/04* (2006.01)
(Continued)

(52) U.S. Cl.
CPC ........ *B60K 7/0007* (2013.01); *B60B 27/0021* (2013.01); *B60B 27/04* (2013.01);
(Continued)

(58) Field of Classification Search
CPC .. B60K 7/0007; B60K 17/043; B60K 17/046; B60K 7/00
See application file for complete search history.

(56) References Cited

U.S. PATENT DOCUMENTS

| 2,087,229 | A | * | 7/1937 | Baffi | ................. | G01F 3/225 |
| | | | | | | 73/268 |
| 7,703,780 | B2 | * | 4/2010 | Mizutani | ................. | B60G 3/20 |
| | | | | | | 280/124.1 |

(Continued)

FOREIGN PATENT DOCUMENTS

| EP | 3 431 316 | 1/2019 |
| JP | 2011-517638 | 6/2011 |

(Continued)

*Primary Examiner* — Hau V Phan
(74) *Attorney, Agent, or Firm* — Clark & Brody LP

(57) ABSTRACT

A wheel hub bearing unit includes an outer ring disposed on an axially outer side of the hub bearing unit and coupled to a wheel, a stationary shaft passing through a center bore of the outer ring, and a plurality of rolling elements arranged in an annular space between the outer ring and the stationary shaft. Motor and speed reduction units are offset from an axis of the wheel hub bearing unit in a direction perpendicular thereto, with the motor unit disposed adjacent to an axially inner end portion of the stationary shaft. The speed reduction unit includes an output gear coupled to the outer ring and a rolling bearing provided between the output gear and the stationary shaft to support the output gear. A carrier disposed on an axially inner side relative to the hub bearing unit is secured to the axially inner end portion of the stationary shaft.

8 Claims, 8 Drawing Sheets

(51) Int. Cl.
  *B60K 17/356* (2006.01)
  *B60K 17/04* (2006.01)
  *B60B 35/12* (2006.01)
  *B60B 27/00* (2006.01)
  *B60B 35/18* (2006.01)

(52) U.S. Cl.
  CPC .............. *B60B 35/125* (2013.01); *B60K 7/00* (2013.01); *B60K 17/043* (2013.01); *B60K 17/046* (2013.01); *B60K 17/356* (2013.01); *B60B 27/0005* (2013.01); *B60B 35/18* (2013.01); *B60K 2007/0038* (2013.01); *B60K 2007/0061* (2013.01); *Y02T 10/641* (2013.01)

(56) References Cited

U.S. PATENT DOCUMENTS

| | | | | |
|---|---|---|---|---|
| 8,490,729 B2 * | 7/2013 | Walser | ................. | B60K 7/0007 180/65.51 |
| 8,596,395 B2 * | 12/2013 | Hirano | ................. | B60K 7/0007 180/65.51 |
| 8,720,623 B1 * | 5/2014 | Kim | .................... | B60K 17/043 180/65.51 |
| 9,636,999 B2 * | 5/2017 | Shin | .................... | B60K 17/046 |
| 9,821,649 B2 * | 11/2017 | Ishikawa | ................... | F16D 1/10 |
| 2008/0035407 A1 * | 2/2008 | Murata | ................. | B60K 7/0015 180/308 |
| 2008/0308330 A1 * | 12/2008 | Murata | .................. | B60G 7/005 180/65.51 |
| 2011/0115343 A1 | 3/2011 | Walser et al. | | |
| 2012/0312608 A1 | 12/2012 | Baumgartner et al. | | |
| 2013/0088068 A1 | 4/2013 | Walser et al. | | |
| 2013/0337959 A1 * | 12/2013 | Suzuki | ................. | H02K 5/1732 475/149 |
| 2014/0031160 A1 * | 1/2014 | Suzuki | .................... | H02K 7/116 475/149 |
| 2015/0158381 A1 * | 6/2015 | Shin | .................... | B60K 17/046 475/149 |
| 2015/0231959 A1 | 8/2015 | Ishikawa et al. | | |

FOREIGN PATENT DOCUMENTS

| | | |
|---|---|---|
| JP | 2012-183981 | 9/2012 |
| JP | 2014-073730 | 4/2014 |
| JP | 5766797 | 8/2015 |

\* cited by examiner outer side in vehicle width direction outer side in vehicle width direction

IN-WHEEL MOTOR DRIVE DEVICE

TECHNICAL FIELD

The present invention relates to an in-wheel motor drive device that is disposed inside a wheel to drive the wheel, and more particularly, to a wheel hub bearing including a rotary outer ring and a stationary inner ring.

BACKGROUND ART

Among in-wheel motors that are disposed inside a wheel to drive the wheel, some of them employ techniques of offsetting a motor from the rotation axis of a wheel hub, and are conventionally known in disclosures such as, for example, Japanese Patent No. 5766797 (PTL 1). The in-wheel motor (motorized hub) disclosed in PTL 1 includes a hub coupled to a wheel of a wheel assembly, a brake shaft extending along an axle and coupled to the hub at one end, and a disc-shaped brake rotor coupled to the other end of the brake shaft. The brake rotor has an outer diameter about a half of the inner diameter of the wheel. The hub is disposed inside the wheel. An electric traction unit (motor), which drives the hub, is disposed away from any of the hub, brake shaft, and brake rotor.

CITATION LIST

Patent Literature

[PTL 1] Japanese Patent No. 5766797

SUMMARY OF INVENTION

Technical Problem

The inventors of this invention have discovered that the aforementioned conventional in-wheel motor is still susceptible to improvement. Specifically, the presence of the wheel coupled to one end of the hub and the brake rotor coupled to the other end of the hub restricts the space for the electric traction unit (motor) disclosed in PTL 1 to be placed, resultantly requiring downsizing the electric traction unit. More specifically, the electric traction unit (motor) is disposed to offset further radially outside the outer circumference of the brake rotor. In addition, the electric traction unit (motor) is disposed radially inside a rim on the outer circumference of the wheel.

In short, the electric traction unit (motor) that is confined in a narrow annular space, which corresponds to a difference between the radius of the brake rotor and the radius of the wheel, is designed to have a radius smaller than the radius of the brake rotor. Such a small-diameter electric traction unit (motor) cannot generate sufficient driving torque.

Furthermore, since the electric traction unit (motor) is disposed, in isolation, inward in the vehicle width direction relative to the brake shaft and brake rotor, the electric traction unit (motor) completely protrudes inward in the vehicle width direction from the wheel, and accordingly it may interfere with the vehicle body.

The inventors of the present invention discovered that in PTL 1 the offset distance from the axis of the hub to the axis of the electric traction unit (motor) and the distance from the axis of the hub to the outer circumferential surface of the electric traction unit (motor) are set to be longer than the radius of the brake rotor. Then, the inventors have achieved this invention of the in-wheel motor drive device having a shorter length from the axis of the hub to the outer circumferential surface of the motor than conventional products.

Solution to Problem

An in-wheel motor drive device according to the present invention includes a motor unit, a wheel hub bearing unit, a speed reduction unit that reduces the rotational speed of the motor unit and transmits the reduced rotational speed to the wheel hub bearing unit, and a carrier that is linked to a vehicle body member. The wheel hub bearing unit includes an outer ring disposed on an axially outer side of the wheel hub bearing and coupled to a wheel, a stationary shaft passing through a center bore of the outer ring, and a plurality of rolling elements arranged in an annular space between the outer ring and the stationary shaft. The motor unit and speed reduction unit are disposed to offset in a direction perpendicular to an axis of the wheel hub bearing unit. The motor unit is disposed adjacent to an axially inner end portion of the stationary shaft. The carrier is disposed on an axially inner side relative to the wheel hub bearing unit, and secured to the axially inner end portion of the stationary shaft.

According to the present invention, in terms of the position of the wheel hub bearing unit in the direction of the axis, the motor unit is disposed adjacent to the axially inner end of the stationary shaft so as to be close to the stationary shaft. Therefore, the offset distance from the axis of the wheel hub bearing unit to the axis of the electric traction unit (motor) and the distance from the axis of the wheel hub bearing unit to the outer circumferential surface of the motor unit can be reduced, thereby making it possible to increase the radial dimension of the motor unit compared with conventional products in a circular hollow area, which is a limited space, of the wheel. According to the present invention, the output shaft of the speed reduction unit can be stably supported without displacement by providing, in addition to the wheel hub bearing unit, an output-shaft bearing that rotatably supports the output shaft, thereby improving the reliability of the speed reduction unit. Since the stationary shaft extends along the axis of the wheel hub bearing unit, the carrier may be preferably disposed so as to cross the axis of the wheel hub bearing unit. This disposition allows the carrier to properly receive load imposed on the stationary shaft. Note that the vehicle body member refers to a component closer to the vehicle body when viewed from the carrier, and, for example, a suspension device used to attach the in-wheel motor drive device to the vehicle body corresponds to the vehicle body member. The stationary shaft is preferably solid to increase the stiffness. However, the solid stationary shaft may have a drilled small space, such as an oil passage. The speed reduction unit is preferably, although not particularly limited, a parallel shaft gear reducer, or a combination of a parallel shaft gear reducer and a planetary gear train.

The stationary shaft and carrier are non-rotational components. In an embodiment of the present invention, the casing wall part of the speed reduction unit is disposed on the axially inner side relative to the wheel hub bearing unit, and coupled to the axially inner end portion of the stationary shaft. According to the embodiment, the speed reduction unit casing can be supported by the stationary shaft or carrier. Note that the casing wall part refers to a part of a speed reduction unit casing forming a contour of the speed reduction unit. A motor casing forming a contour of the motor unit may be connected with the speed reduction unit casing.

In a preferred embodiment of the present invention, the stationary shaft includes a projecting portion projecting from the axially inner end portion thereof and projecting radially outward further than an axially outer end portion thereof. The projecting portion of the stationary shaft and the motor unit overlap each other when viewed in the direction of the axis of the wheel hub bearing unit. According to the embodiment, the motor unit can be offset from the axis of the wheel hub bearing unit, while the radial dimension of the motor unit can be made larger than conventional products. Preferably, the motor unit is a type of a motor having a rotor on the radially inside and a stator on the radially outside, and the projecting portion of the stationary shaft and the stator of the motor unit are arranged so as to overlap each other when viewed in the direction of the axis of the wheel hub bearing unit. In terms of the position of the wheel hub bearing unit in the direction of the axis, the motor unit may be disposed so as not to overlap the position of the stationary shaft in the direction of the axis, and the projecting portion may be disposed at the boundary between the motor unit and stationary shaft. In this case, the body of the stationary shaft and the stator of the motor unit are arranged so as to overlap each other when viewed in the direction of the axis of the wheel hub bearing unit. Alternatively, the motor unit may be disposed such that the position of the motor unit in the direction of the axis overlaps the position of the stationary shaft in the direction of the axis.

The stationary shaft and carrier are non-rotational components, and are linked to the vehicle body via the suspension device. The casing wall part is also a non-rotational component, and may be preferably supported by and secured to the stationary shaft. In a more preferable embodiment of the invention, the non-rotational projecting portion is secured to an axially outer wall face of the casing wall part. According to the embodiment, the stationary shaft has a top portion at the axially outer end thereof and a root portion at the axially inner end thereof, and the root portion that is made thicker can robustly support the stationary shaft at the root. The projecting portion formed at the root of the stationary shaft preferably expands like a plate, and is, for example, a flange.

In a still more preferable embodiment of the invention, the carrier is secured to an axially inner wall face of the casing wall part. According to the embodiment, the casing wall part can be interposed between and held by the stationary inner ring on the axially outer side and the carrier on the axially inner side. Therefore, the stationary shaft can directly support the casing of the speed reduction unit, and indirectly support the casing of the motor unit. In addition, the stationary shaft is properly attached and secured to the carrier.

In a more preferable embodiment of the present invention, the wheel hub bearing unit further includes a bolt having a head oriented outward in the direction of the axis and a shank oriented inward in the direction of the axis. The shank of the bolt passes through the projecting portion of the stationary shaft and is threadedly engaged in a female threaded hole formed in the casing wall part. According to the embodiment, in an assembly process for manufacturing the in-wheel motor drive device, workers can attach and secure the stationary shaft to the casing wall part from the outer side in the direction of the axis. Therefore, the stationary inner ring can be attached to the casing wall part without space constraints caused by the presence of the motor unit. In addition, the workers can perform attachment and securing operations without concern about the presence or absence of the motor unit situated on the inner side in the direction of the axis, thereby improving the assembly efficiency.

The rotary outer ring and output shaft need to be coupled coaxially, but the coupling structure is not particularly limited. In an embodiment of the present invention, the outer ring and output shaft are spline-coupled. According to the embodiment, the outer ring and output shaft are coupled in a non-relative-rotation manner, while the outer ring and output shaft are permitted to move relatively in the direction of the axis and/or in the direction perpendicular to the axis. Even if an external force is exerted from the wheel and displaces the outer ring, the output shaft is not displaced, and therefore the reliability of the speed reduction unit is improved. In another embodiment, the outer ring and output shaft may be coupled with serrations formed thereon.

The above-described invention includes a wheel hub bearing unit having a rotary outer ring and a stationary inner ring. The inner ring is not limited to an annular ring, and may be a solid shaft. Besides that, the present invention can also include a wheel hub bearing unit having a rotary inner ring and a stationary outer ring. Specifically, as the second invention, the in-wheel motor drive device includes a motor unit, a wheel hub bearing unit, a speed reduction unit that reduces the rotational speed of the motor unit and transmits the reduced rotational speed to the wheel hub bearing unit, and a carrier that is linked to a vehicle body member. The wheel hub bearing unit includes a rotary inner ring disposed on an axially outer side and coupled to a wheel, a stationary outer ring disposed radially outside the rotary inner ring and disposed coaxially with the rotary inner ring, and a plurality of rolling elements arranged in an annular space between the stationary outer ring and the rotary inner ring. The motor unit and the speed reduction unit are disposed to offset in a direction perpendicular to an axis of the wheel hub bearing unit. The carrier includes a carrier body that is disposed on an axially inner side relative to the wheel hub bearing unit, and an extended part extending from the carrier body toward an axially outer side and being secured to the stationary outer ring at the extended part.

According to the embodiment, the carrier body is disposed on the axially inner side relative to the stationary outer ring. The carrier and the stationary outer ring are secured on the axially outer side of the wheel hub bearing unit. In addition, the motor unit is disposed to offset from the axis of the wheel hub bearing unit. In terms of the position of the wheel hub bearing unit in the direction of the axis, the carrier body is disposed on the axially inner side, the carrier and stationary outer ring are coupled on the axially outer side, and the motor unit is disposed at an axially center region between the carrier body and the coupling point of the carrier and stationary outer ring, thereby placing the motor unit closer to the stationary shaft. Consequently, the offset distance from the axis of the wheel hub bearing unit to the axis of the electric traction unit (motor), and the distance from the axis of the wheel hub bearing unit to the outer circumferential surface of the motor unit can be reduced, thereby making the radial dimension of the motor unit larger than conventional products in a circular hollow area, which is a limited space, of the wheel. The number of the extended part may be one, but preferably two or more extended parts are provided.

In a preferable embodiment of the invention, the wheel hub bearing unit includes a hub attachment that is coupled to the stationary outer ring and expands radially outward further than the stationary outer ring. The extended part of the carrier is attached and secured to the hub attachment.

According to the embodiment, the stationary outer ring of the wheel hub bearing unit is substantially expanded radially outward, and therefore the stationary outer ring can be properly attached and secured to the carrier.

Advantageous Effects of Invention

As described above, the present invention can make the offset distance from the axis of the wheel hub bearing unit to the axis of the motor, and the distance from the axis of the wheel hub bearing unit to the outer circumferential surface of the motor shorter than those of the conventional products. Therefore, the radial dimension of the motor unit can be ensured in the narrow hollow area in the wheel by making the distance from the rim of the wheel to the outer circumferential surface of the motor, thereby increasing the motor output.

DESCRIPTION OF EMBODIMENT

Figure 1:
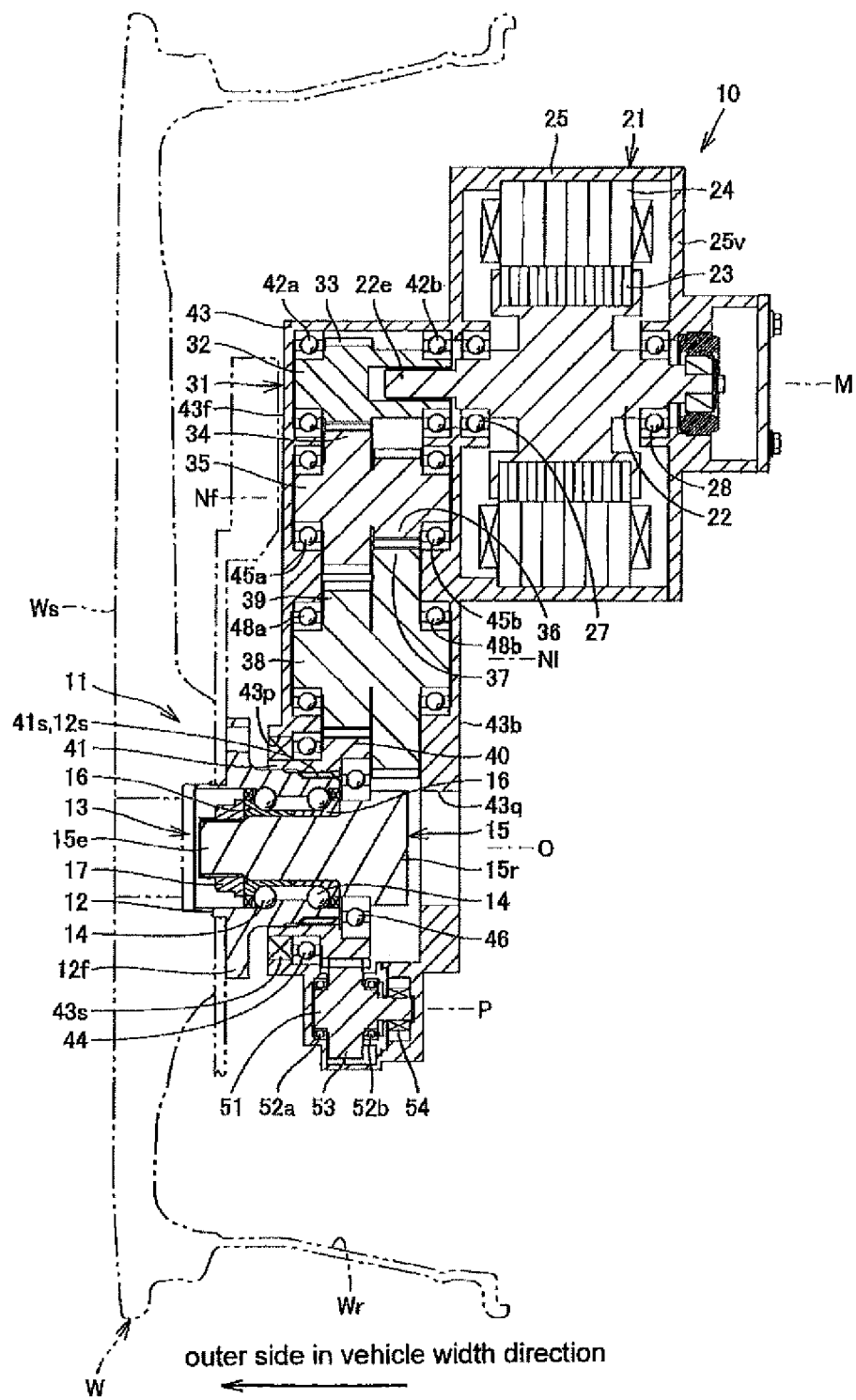
FIG. 1 is a schematic developed cross-sectional view of an in-wheel motor drive device according to the first embodiment of the present invention, the in-wheel motor drive device being cut along a predetermined plane and developed.
Figure 2:
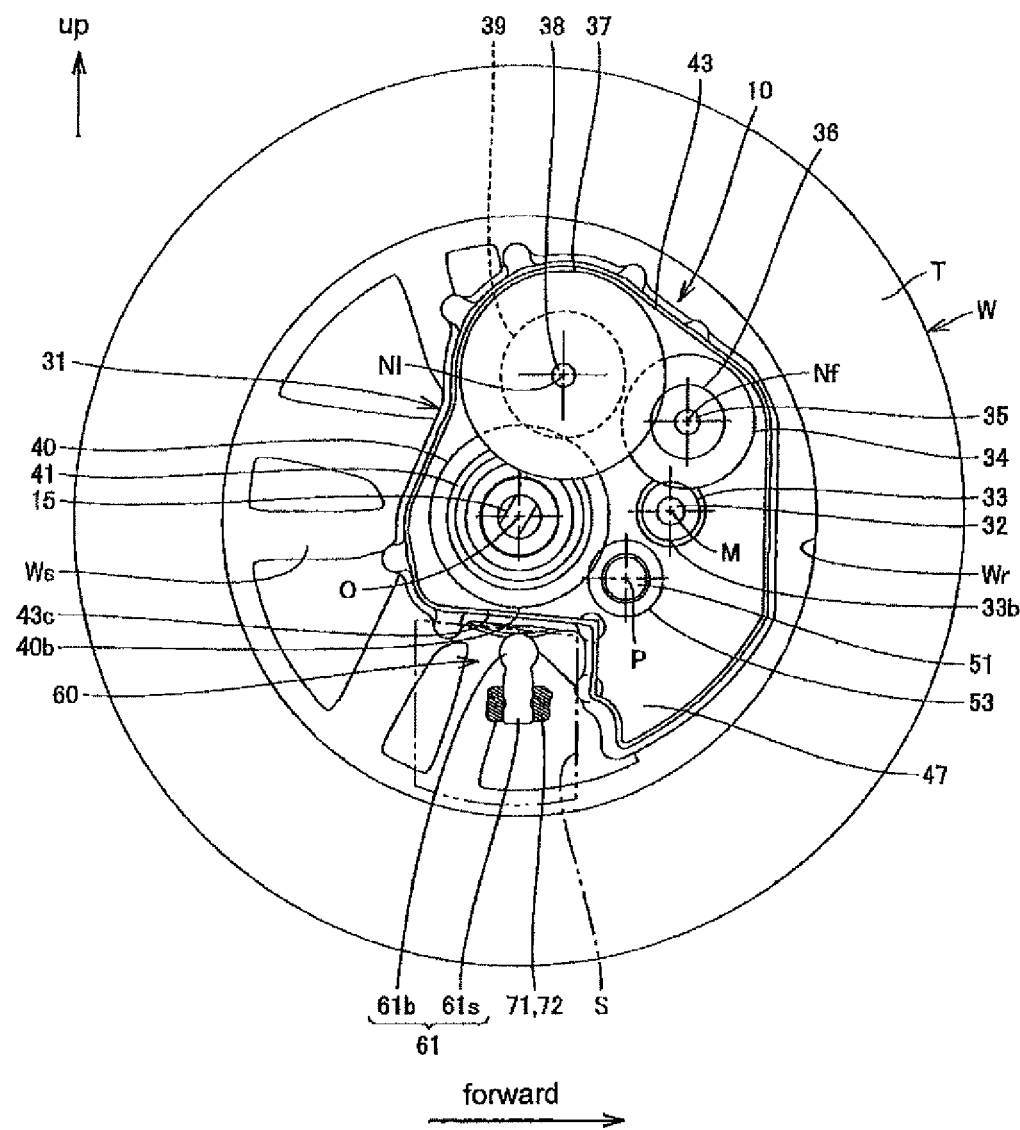
FIG. 2 is a back view showing the inside of the in-wheel motor drive device of the first embodiment with a wheel assembly.

With reference to the accompanying drawings, embodiments of the present invention will be described below. FIG. 1 is a schematic developed cross-sectional view of an in-wheel motor drive device according to the first embodiment of the present invention, the in-wheel motor drive device being cut along a predetermined plane and developed. FIG. 2 is a back view showing the inside of the in-wheel motor drive device of the first embodiment with a wheel assembly, viewed from the right side of FIG. 1, with a motor unit 21 and a back part 43b of a main casing 43 removed from the in-wheel motor drive device 10 in FIG. 1. The predetermined plane shown in FIG. 1 is a developed plane made by connecting a plane including an axis M and an axis Nf, a plane including the axis Nf and an axis Nl, and a plane including the axis Nl and an axis O, shown in FIG. 2, in this order.

The in-wheel motor drive device 10 includes a wheel hub bearing unit 11 coupled to the center of a road wheel W indicated by a phantom line as shown in FIG. 1, a motor unit 21 driving the road wheel W of a wheel assembly, and a speed reduction unit 31 reducing the rotational speed of the motor unit and transmitting the reduced rotational speed to the wheel hub bearing unit 11, and the in-wheel motor drive device 10 is disposed in a wheel housing (not shown) of an electric vehicle. The motor unit 21 and speed reduction unit 31 are not arranged coaxially with the axis O of the wheel hub bearing unit 11, but are offset from the axis O of the wheel hub bearing unit 11 as shown in FIG. 2. The road wheel W is a well-known wheel with a tire T fitted on the outer circumference of the road wheel W, and is attached to the front left, front right, rear left, and rear right of a vehicle body. The vehicle body and wheels construct an electric vehicle. The in-wheel motor drive device 10 allows the electric vehicle to move at 0 to 180 km/h on public roads.

The wheel hub bearing unit 11 includes an outer ring 12 serving as a wheel hub coupled to the road wheel W an inner stationary member 13 passing through a center bore of the outer ring 12, and a plurality of rolling elements 14 arranged in an annular gap between the outer ring 12 and inner stationary member 13, and the wheel hub bearing unit 11 constructs an axle. The inner stationary member 13 includes a non-rotational stationary shaft 15, a pair of inner races 16, and a locknut 17. The stationary shaft 15 has a top portion 15e and a root portion 15r having a diameter greater than that of the top portion 15e. The inner races 16 fit around the outer circumference of the stationary shaft 15 between the root portion 15r and top portion 15e. The locknut 17 is threadedly engaged with the top portion 15e of the stationary shaft 15 to secure the inner races 16 between the locknut 17 and root portion 15r.

The stationary shaft 15 extends along the axis O, and the top portion 15e of the stationary shaft 15 is oriented outward in the vehicle width direction. The root portion 15r of the stationary shaft 15 projects inward in the vehicle width direction relative to the outer ring 12, and faces an opening 43q formed in the back part 43b of the main casing 43. The opening 43q accepts a carrier, which is not illustrated, inserted from outside, and the carrier is attached and secured to the root portion 15r of the main casing 43. The carrier is also coupled to a suspension member, which is not illustrated, outside the main casing 43.

The rolling elements 14 are arranged in double rows separately in the axis-O direction. The outer circumferential surface of one of the inner races 16 situated on the outer side in the axis-O direction serves as an inner raceway for the first-row rolling elements 14, and faces the inner circumferential surface of an axially outer side of the outer ring 12 in the axis-O direction. The outer circumferential surface of the other inner race 16 situated on the inner side in the axis-O direction serves as an inner raceway for the second-row rolling elements 14, and faces the inner circumferential surface of an axially inner side of the outer ring 12 in the axis-O direction. In the following description, the outer side (outboard side) in the vehicle width direction may be referred to as an axially outer side, and the inner side (inboard side) in the vehicle width direction may be referred to as an axially inner side. The right-left direction of FIG. 1 corresponds to the vehicle width direction. The inner circumferential surface of the outer ring 12 constructs outer raceways for the rolling elements 14.

The outer ring 12 has a flange 12f formed at an axially outer end thereof in the axis-O direction. The flange 12f constructs a coupling seat to coaxially couple with a brake rotor, which is not illustrated, and a spoke section Ws of the road wheel W. The outer ring 12 is coupled to the road wheel W with the flange 12f, and rotates together with the road wheel W.

The motor unit 21 includes, as shown in FIG. 1, a motor rotary shaft 22, a rotor 23, a stator 24, a motor casing 25, and a motor casing cover 25v, that are arranged in this order radially outward from the axis M of the motor unit 21. The motor unit 21 is a radial gap motor of an inner rotor and outer stator type, but may be other types of motors. For instance, although it is not illustrated, the motor unit 21 can be an axial gap motor.

The axis M, which is the center of rotation of the motor rotary shaft 22 and rotor 23, extends in parallel with the axis O of the wheel hub bearing unit 11. In other words, the motor unit 21 is disposed to offset from the axis O of the wheel hub bearing unit 11. Except for a tip portion of the motor rotary shaft 22, the position of most of the motor unit 21 in the axial direction does not overlap the position of the inner stationary member 13 in the axis-O direction, as shown in FIG. 1. The motor casing 25 is substantially cylindrical, and has an axially outer end in the axis-M direction coupled to the back part 43b of the main casing 43, and an axially inner end in the axis-M direction shielded with the bowl-like motor casing cover 25v. The opposite ends of the motor rotary shaft 22 are rotatably supported by the motor casing 25 with rolling bearings 27, 28. The motor unit 21 drives the outer ring 12.

The speed reduction unit 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main casing 43. The input shaft 32 is a tubular component having a diameter greater than that of a tip portion 22e of the motor rotary shaft 22, and extends along the axis M of the motor unit 21. The tip portion 22e is received in a center bore formed in an axially inner end portion of the input shaft 32 in the axis-M direction, resultantly coaxially coupling the input shaft 32 with the motor rotary shaft 22. The input shaft 32 is supported at both ends by the main casing 43 with rolling bearings 42a, 42b. The input gear 33 is an external gear having a diameter smaller than that of the motor unit 21, and is coaxially coupled to the input shaft 32. Specifically, the input gear 33 is integrally formed on the outer circumference of the input shaft 32, and is located at a center part of the input shaft 32 in the axis-M direction.

The output shaft 41 is a tubular component having a diameter greater than that of the outer ring 12, and extends along the axis O of the wheel hub bearing unit 11. An axially inner end of the outer ring 12 in the axis-O direction is received in a center bore formed in an axially outer end of the output shaft 41 in the axis-O direction, resultantly coaxially coupling the outer ring 12 to the output shaft 41. Specifically, spline grooves 41s are formed in the inner circumferential surface of the output shaft 41, while spline grooves 12s are formed in the outer circumferential surface of the axially inner end of the outer ring 12, and the spline grooves 41s, 12s are spline-fitted to one another. The spline fitting achieves torque transmission between the output shaft 41 and outer ring 12 and also permits the output shaft 41 and outer ring 12 to move relatively.

The axially outer end of the output shaft 41 in the axis-O direction is supported by the main casing 43 with a rolling bearing 44. An axially inner end of the output shaft 41 in the axis-O direction is supported by the root portion 15r of the stationary shaft 15 with a rolling bearing 46. The output gear 40 is an external gear, and is coaxially coupled to the output shaft 41. Specifically, the output gear 40 is integrally formed on the outer circumference of the output shaft 41, and is located at the axially inner end of the output shaft 41 in the axis-O direction.

The two intermediate shafts 35, 38 extend in parallel with the input shaft 32 and output shaft 41. Specifically, the speed reduction unit 31 is a parallel four-shaft gear reducer, and the axis O of the output shaft 41, the axis Nf of the intermediate shaft 35, the axis Nl of the intermediate shaft 38, and the axis M of the input shaft 32 extend in parallel with one another, in other words, extend in the vehicle width direction. Note that the parallel shaft gear reducer refers to speed reducers that include an input shaft and an output shaft extending in parallel with each other and may include one or more parallel-extending intermediate shafts.

In terms of positions of the shafts with respect to the front-rear direction of the vehicle, as shown in FIG. 2, the axis M of the input shaft 32 is positioned forward of the axis O of the output shaft 41. The axis Nf of the intermediate shaft 35 is also positioned forward of the axis M of the input shaft 32. The axis Nl of the intermediate shaft 38 is positioned forward of the axis O of the output shaft 41, and rearward of the axis M of the input shaft 32. In a modification which is not illustrated, the input shaft 32, intermediate shaft 35, intermediate shaft. 38, and output shaft 41 may be disposed in this order in the front-rear direction of the vehicle. This order is also the order in which a driving force is transmitted.

In terms of positions of the shafts with respect to the up-down direction, the axis M of the input shaft 32 is positioned higher than the axis O of the output shaft 41. The axis Nf of the intermediate shaft 35 is positioned higher than the axis M of the input shaft 32. The axis Nl of the intermediate shaft 38 is positioned higher than the axis Nf of the intermediate shaft 35. In a modification which is not illustrated, the intermediate shaft 35 may be disposed higher than the intermediate shaft 38, but both the intermediate shafts 35, 38 need to be disposed higher than the input shaft 32 and output shaft 41. In an alternative modification which is not illustrated, the output shaft 41 may be disposed higher than the input shaft 32.

The intermediate gear 34 and intermediate gear 36, which are external gears, as shown in FIG. 1, are coaxially coupled to the intermediate shaft 35, and are located at a center part of the intermediate shaft 35 in the axis-Nf direction. The intermediate shaft 35 is supported at both ends by the main casing 43 with rolling bearings 45a, 45b. The intermediate gear 37 and intermediate gear 39, which are external gears, are coaxially coupled to the intermediate shaft 38, and are located at a center part of the intermediated shaft 38 in the axis-Ni direction. The intermediate shaft 38 is supported at both ends by the main casing 43 with rolling bearings 48a, 48b.

The main casing 43 forms a contour of the speed reduction unit 31 and wheel hub bearing unit 11, is formed in the shape of a tube, and, as shown in FIG. 2, encloses the axes O, Nf, Nl, and M which extend in parallel with one another. The main casing 43 is housed in a hollow area in the road wheel W. The hollow area in the road wheel W is defined by the inner circumferential surface of a rim Wr and the spoke section Ws that is coupled to an axially outer end of the rim Wr in the axis-O direction. The wheel hub bearing unit 11, speed reduction unit 31, and an axially outer part of the motor unit 21 are housed in the hollow area in the road wheel W. An axially inner part of the motor unit 21 protrudes toward the axially inner side from the road wheel W. As described above, the road wheel W houses most of the in-wheel motor drive device 10.

Referring to FIG. 2, the main casing 43 projects downward. The projecting part of the main casing 43 is positioned away from the axis O of the output gear 40 in the front-rear direction of the vehicle, more specifically, immediately below the axis M of the input gear 33. The projecting part forms an oil tank 47. Between a lower part 43*c* of the main casing 43, which is positioned immediately below the axis O, and a lower part of the rim Wr formed is a space S. In the space S, a suspension member 71 is disposed so as to extend in the vehicle width direction, and an outer end 72 of the suspension member 71 in the vehicle width direction, and the inner stationary member 13 are coupled to each other with a ball joint 60 in a movable manner in any direction.

The main casing 43, which is in the shape of a tube, as shown in FIG. 1, houses the input shaft 32, input gear 33, intermediate gear 34, intermediate shaft 35, intermediate gear 36, intermediate gear 37, intermediate shaft 38, intermediate gear 39, output gear 40, and output shaft 41, and also covers an axially inner end of the wheel hub bearing unit 11 in the axis-O direction. Lubricating oil is filled in the main casing 43. The input gear 33, intermediate gear 34, intermediate gear 36, intermediate gear 37, intermediate gear 39, and output gear 40 are helical gears.

The main casing 43 includes, as shown in FIG. 1, a front part 43*f* that is substantially flat and covers an axially outer side of a tubular part of the speed reduction unit 31, and a back part 43*b* that is substantially flat and covers an axially inner side of the tubular part of the speed reduction unit 31. The back part 43*b* is coupled to the motor casing 25. The back part 43*b* is also coupled to a suspension member, such as an arm and a strut, which is not illustrated, with a carrier, which is not illustrated. Thus, the in-wheel motor drive device 10 is supported by the suspension member.

The front part 43*f* has an opening 43*p* through which the outer ring 12 passes. The opening 43*p* is provided with a seal member 43*s* that seals an annular gap between the outer ring 12 and the front part 43*f*. The outer ring 12, serving as a rotating element, is housed in the main casing 43, except for an axially outer end portion thereof in the axis-O direction. The front part 43*f* is a component that supports the rolling bearings 42*a* and 44.

The input gear 33 having a small diameter and the intermediate gear 34 having a large diameter are disposed on an axially outer side of the speed reduction unit 31 and mesh with each other. The intermediate gear 36 having a small diameter and the intermediate gear 37 having a large diameter are disposed on an axially inner side of the speed reduction unit 31 and mesh with each other. The intermediate gear 39 having a small diameter and the output gear 40 having a large diameter are disposed on the axially outer side of the speed reduction unit 31 and mesh with each other. Thus, the input gear 33, intermediate gears 34, 36, 37, 39, and output gear 40 mesh with one another, and make up a driving-force transmission path extending from the input gear 33 to the output gear 40 via the intermediate gears 34, 36, 37, 39. The above-described mesh of the small-diameter gears and large-diameter gears allows the intermediate shaft 35 to reduce the rotational speed of the input shaft 32, the intermediate shaft 38 to reduce the rotational speed of the intermediate shaft 35, and the output shaft 41 to reduce the rotational speed of the intermediate shaft 38. Thus, the speed reduction unit 31 can provide a sufficient speed reduction ratio. In the plurality of intermediate gears, the intermediate gear 34 serves as a first intermediate gear that is located on an input side of the driving-force transmission path. In the plurality of intermediate gears, the intermediate gear 39 serves as a final intermediate gear that is located on an output side of the driving-force transmission path.

As shown in FIG. 1, the input gear 33, intermediate gear 34, intermediate gear 39, and output gear 40 are disposed on the axially outer side of the speed reduction unit 31 (outer side in the vehicle width direction) and construct a first gear train. The intermediate gears 36 and 37 are disposed on the axially inner side of the speed reduction unit 31 (inner side in the vehicle width direction) and construct a second gear train. The position of the first gear train in the axis-O direction overlaps the position of the outer ring 12 in the axis-O direction, also overlaps the position of the rolling bearing 46 in the axial direction, and further overlaps the position of the second-row rolling elements 14 in the axial direction. On the other hand, the second gear train is disposed inwardly away from the outer ring 12 in the axis-O direction, and therefore the positions of the second gear train and outer ring 12 in the axis-O direction do not overlap.

As shown in FIG. 2, the output shaft 41, intermediate shaft 38, and input shaft 32 are disposed in this order, at intervals, in the front-rear direction of the vehicle. The intermediate shaft 35 and intermediate shaft 38 are disposed higher than the input shaft 32 and output shaft 41. According to the first embodiment, the intermediate shafts can be disposed above the outer ring 12 serving as a wheel hub, thereby providing a space for the oil tank 47 below the outer ring 12, and also providing a space S immediately below the outer ring 12. Therefore, a vertically-extending kingpin axis can be provided so as to cross the space S, and the road wheel W and in-wheel motor drive device 10 can properly turn about the kingpin axis.

According to the embodiment, as shown in FIG. 2, the axis M of the motor unit 21 is offset from the axis O of the wheel hub bearing unit in the front-rear direction of the vehicle, the axis Nf of the intermediate shaft 35 is offset upward from the axis O of the wheel hub bearing unit, and the axis Nl of the intermediate shaft 38 is offset upward from the axis O of the wheel hub bearing unit. This arrangement can create the space S between the lower part 43*c*, which is situated immediately below the axis O, and the lower part of the rim Wr in the in-wheel motor drive device 10. Therefore, the kingpin axis of the wheel assembly can be positioned so as to cross the road wheel W, thereby improving the turning property of the wheel assembly.

According to the embodiment, the input shaft 32 and output shaft 41 extend in the vehicle width direction as shown in FIG. 1, the input gear 33 and output gear 40 are in a vertical standing position as shown in FIG. 2, and the output gear 40 is disposed such that a lower edge 40*b* of the output gear 40 is located lower than a lower edge 33*b* of the input gear 33. This arrangement can prevent the fast-rotating input gear 33 from being immersed in lubricating oil pooled below the speed reduction unit 31 in the main casing 43, and therefore avoid agitation resistance to the input gear 33.

According to the embodiment, as shown in FIG. 2, the intermediate shafts 35 and 38 are, respectively, a first intermediate shaft 35 that is disposed almost adjacent to and above the input shaft 32 and is supplied with driving torque from the input shaft 32, and a final intermediate shaft 38 that is disposed almost adjacent to and above the output shaft 41 and supplies driving torque to the output shaft 41. The input shaft 32, first intermediate shaft 35, final intermediate shaft 38, and output shaft 41 are disposed such that a base line obtained by sequentially connecting the center (axis M) of the input shaft, the center (axis Nf) of the first intermediate shaft 35, the center (axis Nl) of the final intermediate shaft 38, and the center (axis O) of the output shaft 41 creates an upside-down U letter shape when viewed in the axial direction of the intermediate shafts 35, 38. This arrangement shrinks the entire layout of the shafts and gears making up the driving-force transmission path, and therefore the shafts and gears can be housed inside the road wheel W.

According to the embodiment, as shown in FIG. 1, the outer ring 12 serving as a wheel hub is a tubular component, and the wheel hub bearing unit 11 further includes the stationary shaft 15 that is disposed in the center bore of the outer ring 12 to rotatably support the outer ring 12. This configuration makes it possible to coaxially couple the output gear 40 with the outer ring 12 on the radially outside the outer ring 12. Consequently, the outer ring 12 can receive driving force transmitted from the intermediate shaft 38, which is offset with respect to the outer ring 12 as a center.

The main casing 43 further houses, as shown in FIG. 1, a pump shaft 51, rolling bearings 52a, 52b, a pump gear 53, and an oil pump 54. The pump shaft 51 has an axis P extending in parallel with the axis O of the output shaft 41. In addition, the pump shaft 51 is disposed apart from the output shaft 41 in the front-rear direction of the vehicle, is rotatably supported at opposite ends in the axis-P direction with the rolling bearings 52a, 52b, and is coaxially coupled to the pump gear 53 at an axially center part of the pump shaft 51 in the axis-P direction. The pump gear 53 is in mesh with the output gear 40.

The oil pump 54 is disposed further inward of the rolling bearing 52b in the axis-P direction, and is provided on an axially inner end of the pump shaft 51 in the axis-P direction. The oil pump 54 driven by the output gear 40 draws the lubricating oil up from the oil tank 47, and discharges the drawn lubricating oil to the motor unit 21 and speed reduction unit 31. Accordingly, the motor unit 21 and speed reduction unit 31 are lubricated.

Referring to FIG. 2, the pump shaft 51 in the first embodiment is disposed below the input shaft 32, while the oil tank 47 is disposed below the pump shaft 51. The oil pump 54 is disposed substantially coaxially with the pump shaft 51, and draws up the lubricating oil pooled in the oil tank 47 toward immediately above the oil tank 47. The pump shaft 51 and oil tank 47 are disposed forward of the output shaft 41 in the front-rear direction of the vehicle. When the vehicle runs with the wheels W driven by the in-wheel motor drive devices 10, the oil tanks 47 catch wind coming from the front side of the vehicle and are air-cooled.

Next, the coupling structure between the main casing 43 and inner stationary member 13 will be described.

Figure 3:
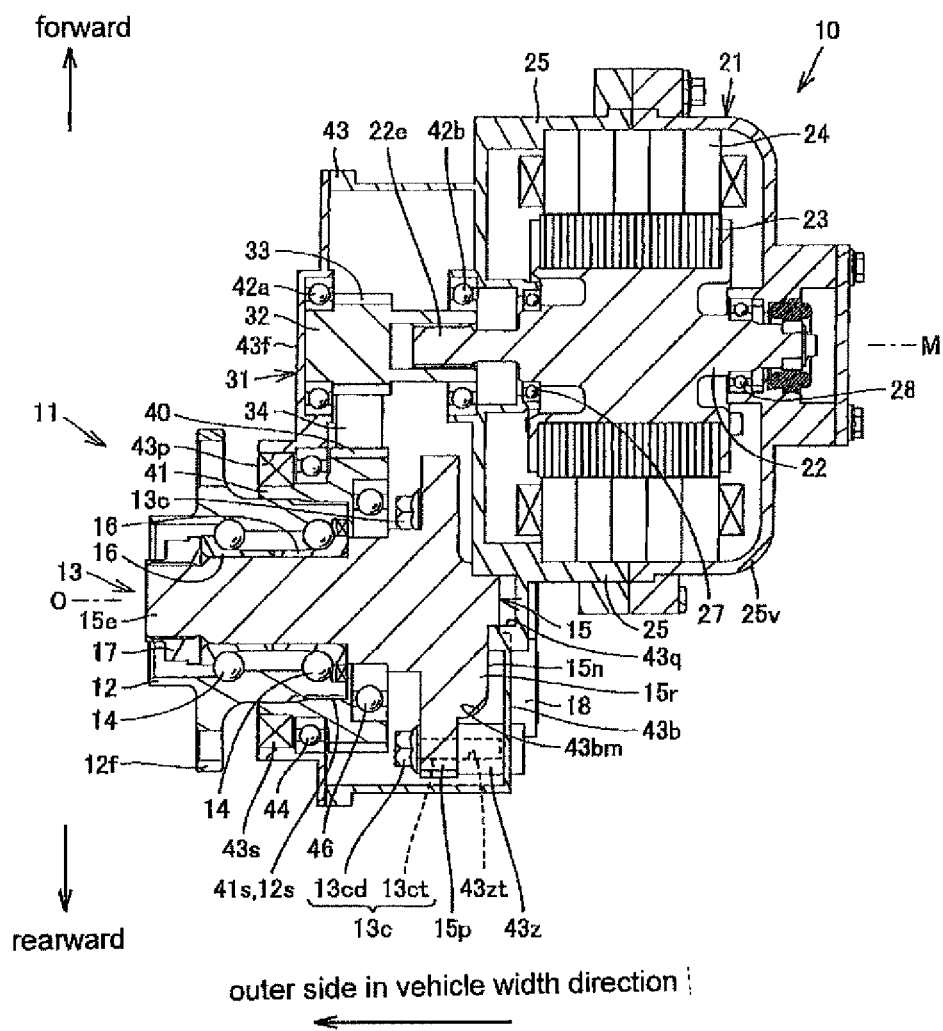
FIG. 3 is a vertical cross-sectional view of the in-wheel motor drive device of the first embodiment.
Figure 4:
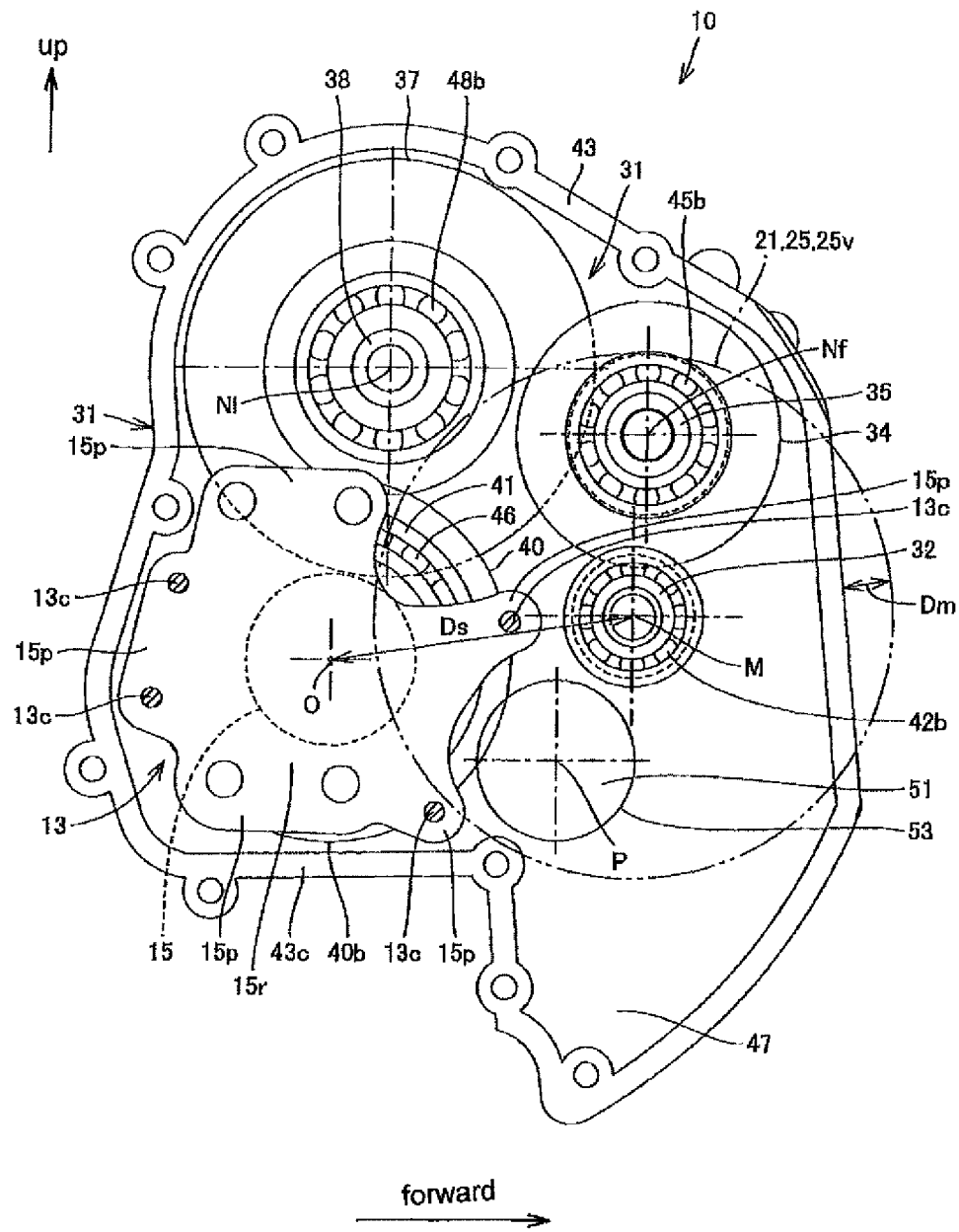
FIG. 4 is a back view showing the inside of the in-wheel motor drive device of the first embodiment.
Figure 6:
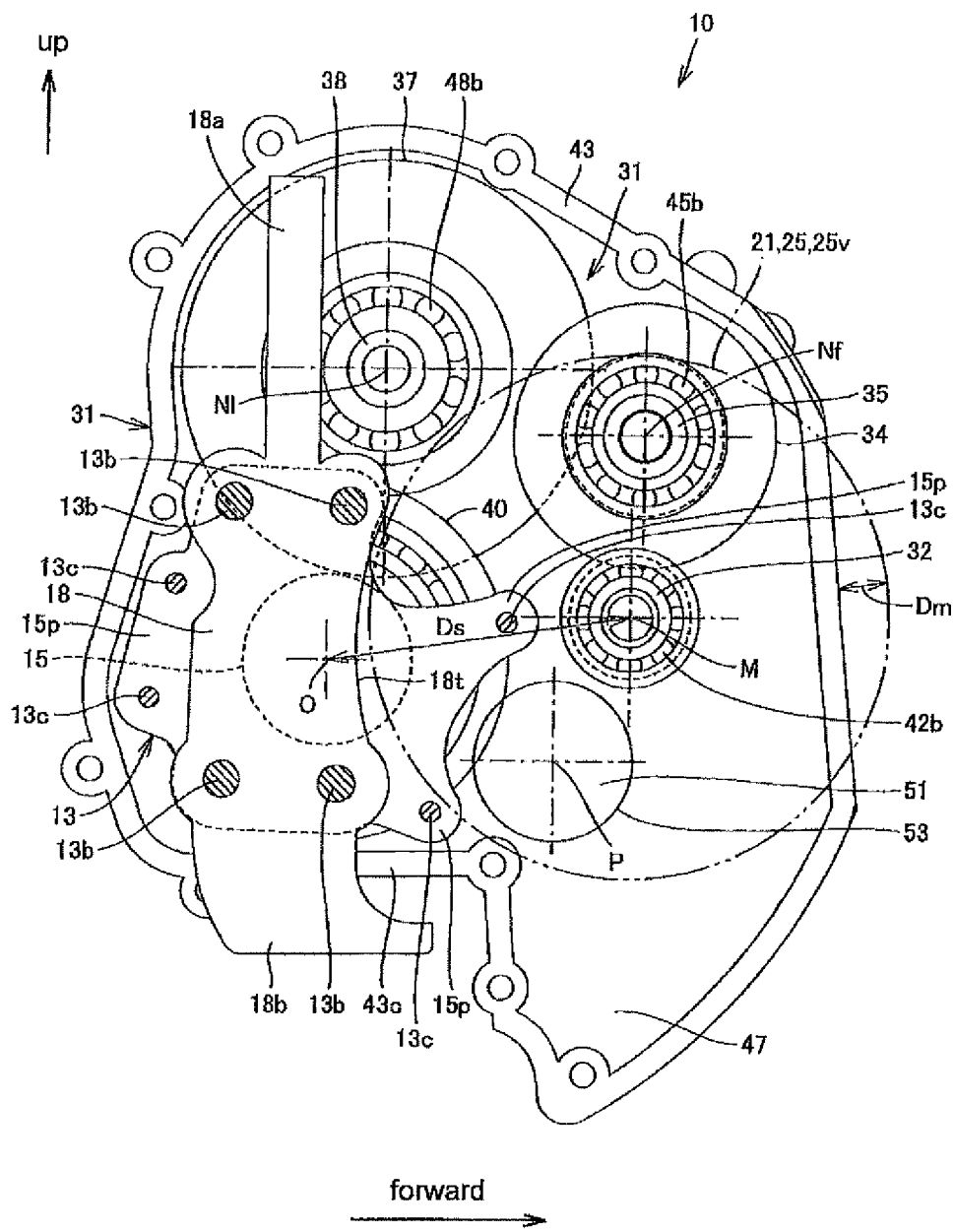
FIG. 6 is a back view showing the inside of the in-wheel motor drive device of the first embodiment.

FIG. 3 is a vertical cross-sectional view of the in-wheel motor drive device 10 taken along a plane including the axes O and M in FIG. 2. FIGS. 4 and 6 are back views showing the inside of the in-wheel motor drive device of the first embodiment, when viewed from the right side (inner side in the vehicle width direction) of FIG. 1, with the motor unit 21 and the back part 43b of the main casing 43 removed from the in-wheel motor drive device 10 in FIG. 1. As shown in FIG. 3, the back part 43b of the main casing 43 are interposed between the motor unit 21 and speed reduction unit 31, and also between the motor unit 21 and wheel hub bearing unit 11. The back part 43b covers the axially inner ends of the speed reduction unit 31 and wheel hub bearing unit 11. FIG. 2 and later figures omit individual teeth on the outer circumference of the intermediate gear 34.

The stationary shaft 15 has an axially inner end face 15n, which is a surface on the inner side of the stationary shaft 15 in the axis-O direction, and the axially inner end face 15n is secured to an axially outer wall face 43bm, which is a surface on the outer side of the back part 43b in the axis-O direction. More specifically, the stationary shaft 15 has a projecting portion 15p projecting radially outward from the root portion 15r, which is an axially inner end of the stationary shaft 15 in the axis-O direction. The projecting portion 15p is secured to the axially outer wall face 43bm of the back part 43b. In the back part 43b, which is one of wall parts making up the main casing 43, the axially outer wall face 43bm is a wall face oriented toward the outer side in the vehicle width direction, and is an inner wall face of the main casing 43.

The projecting portion 15p is secured to the back part 43b with bolts 13c. On the back part 43b formed is a coupling seat 43z. The coupling seat 43z has a bolt hole 43zt oriented outward in the axial direction. The bolt 13c extending in parallel with the axis O has a head 13cd on the axially outer side thereof in the axis-O direction, and a shank 13ct on the axially inner side thereof in the axis-O direction, and the shank 13ct passes through the projecting portion 15p to threadedly engage with the coupling seat 43z.

In addition, most of the wheel hub bearing unit 11, except for the root portion 15r, is disposed on the outer side in the axis-O direction relative to the back part 43b. Most of the motor unit 21, except for the tip portion 22e, is disposed on the inner side in the axis-O direction relative to the back part 43b. This means that the back part 43b functions as a boundary between the wheel hub bearing unit 11 and motor unit 21. The motor casing 25 of the motor unit 21 is disposed adjacent to the root portion 15r of the stationary shaft 15.

FIG. 4 uses a dashed double-dotted line to represent the motor unit 21 situated closest to viewers when viewing the drawing from a direction perpendicular to the drawing. As shown in FIG. 4, the stationary shaft 15 and motor unit 21 are arranged so as to overlap each other when viewed in the axis-O direction of the wheel hub bearing unit 11. The projecting portion 15p is arranged so as to expand like a plate from the outer circumferential surface of the inner side of the stationary shaft 15 in the axis-O direction and also to overlap the motor unit 21. Preferably, the projecting portion 15p of the stationary shaft 15 and a cylindrical stator 24 (FIG. 3) are arranged so as to overlap each other when viewed in the axis-O direction. More preferably, the body of the stationary shaft 15 including the top portion 15e (FIG. 3) and the stator 24 (FIG. 3) are arranged so as to overlap each other when viewed in the axis-O direction.

Next, a link structure between the in-wheel motor drive device 10 and suspension member 71 will be described.

Figure 5:
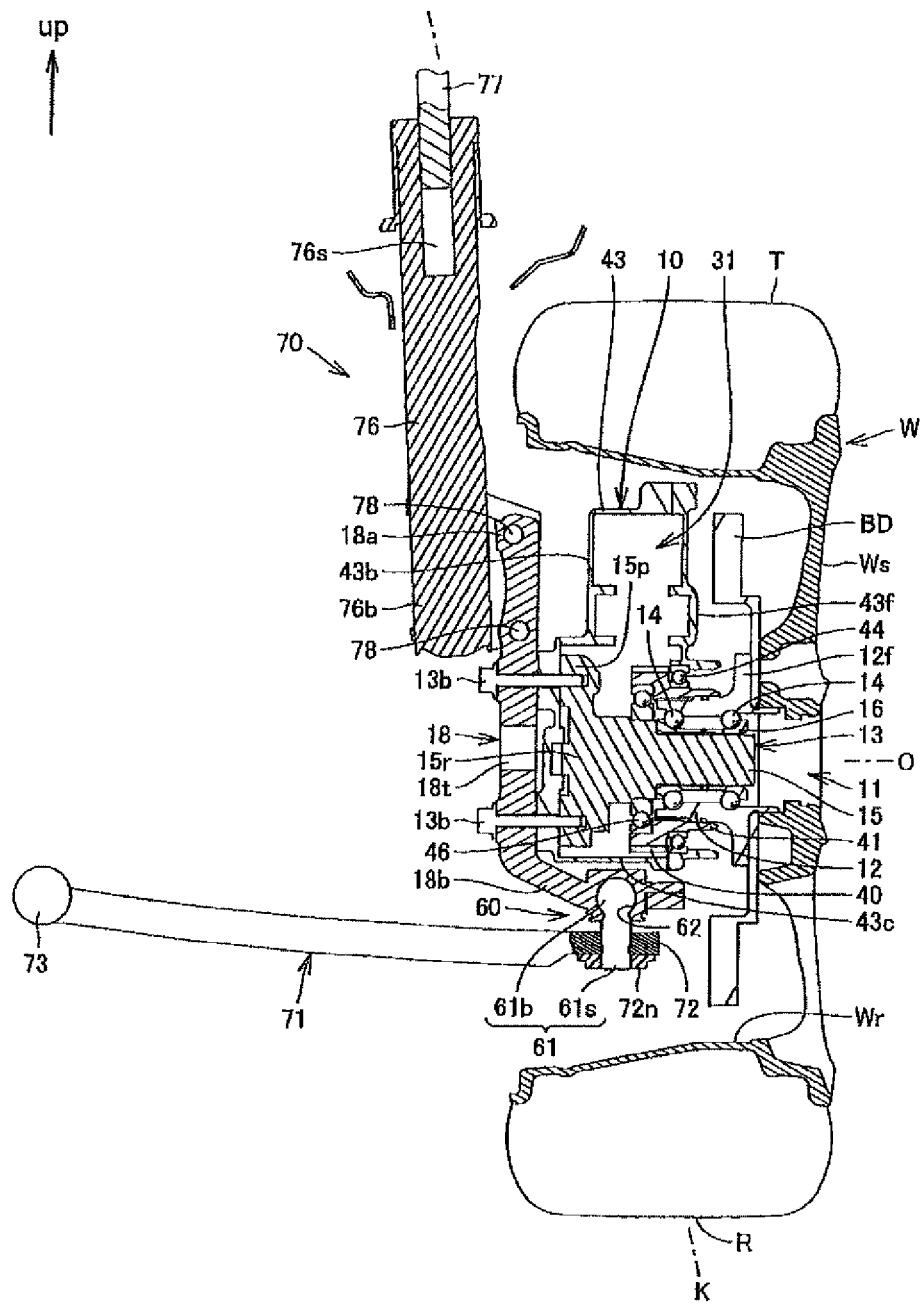
FIG. 5 is a cross-sectional view of the in-wheel motor drive device of the first embodiment with a suspension device.

FIG. 5 is a cross-sectional view showing the link structure between the in-wheel motor drive device 10 and suspension device 70 when viewed in the front-rear direction of the vehicle. A spoke section Ws of the road wheel W and a brake rotor BD are attached and secured to the flange 12f of the outer ring 12. A caliper, which is not illustrated, is attached and secured to a rear part of the main casing 43 in the front-rear direction of the vehicle. The caliper brakes the brake rotor BD. In order to provide clear understanding of the present invention, the brake rotor BD, which is to be disposed in the hollow area in the road wheel W, is omitted in FIG. 4 and later figures. The outer ring 12 is disposed on the outer side in the vehicle width direction with respect to the center of the road wheel W (the center between one end to the other end of the road wheel W on the axis O).

The suspension device 70 is a strut-type suspension device including two suspension members 71, 76. The suspension member 76 is a vertically extending strut incorporating a shock absorber 76s that is extensible and compressible vertically. A coil spring, which is not illustrated, is coaxially disposed on the outer circumference of an upper end region 77 of the suspension member 76 to ease the vertical axial force acting on the suspension member 76. The damper incorporated in the shock absorber 76s attenuates the extending and compressing motion of the suspension member 76 (strut). The suspension member 76 has an upper end that supports the vehicle body, which is not illustrated.

The suspension member 71 is a lower arm (suspension arm) disposed lower than the suspension member 76 and extending in the vehicle width direction. The suspension member 71 has an outer end 72 situated on the outer side in the vehicle width direction, and an inner end 73 situated on the inner side in the vehicle width direction. The suspension member 71 is coupled to the in-wheel motor drive device 10 at the outer end 72 with a ball joint 60. In addition, the suspension member 71 is coupled to a vehicle body member, which is not illustrated, at the inner end 73 in the vehicle width direction. The suspension member 71 is swingable vertically with the inner end 73 as a base end and the outer end 72 as a free end. Note that the vehicle body member is a component attached to the vehicle body side when viewed from the components of interest.

The ball joint 60 includes a ball stud 61 and a socket 62. The ball stud 61 extends vertically, and has a ball 61*b* formed on the upper end thereof and a stud 61*s* formed on the lower end. The socket 62 is provided near the inner stationary member 13, and slidably holds the ball 61*b*. The stud 61*s* vertically passes through the outer end 72. The stud 61*s* has male threads cut around the lower end surface thereof, and is attached and secured to the suspension member 71 by a nut 72*n* screwed in from below.

As shown in FIG. 5, the carrier 18 is coupled to the back part 43*b* with bolts 13*b*. With respect to the back part 43*b*, which is a wall part of the main casing 43, the stationary shaft 15 is disposed inside the main casing 43, while the carrier 18 is disposed outside the main casing 43. The bolts 13*b* extending in parallel with the axis O have a head at the inner side thereof in the vehicle width direction. The bolts 13*b* are inserted into through holes in the carrier 18 from the inner side in the vehicle width direction, further pass through through holes in the back part 43*b* on the outer side in the vehicle width direction relative to the carrier 18, and are threadedly engaged in female threaded holes in the root portion 15*r* of the stationary shaft 15 on the outer side in the vehicle width direction relative to the back part 43*b*.

The carrier 18 has an upper arm 18*a* extending upward and a lower arm 18*b* extending downward as shown in FIG. 5. The upper arm 18*a* projects upward beyond the wheel hub bearing unit 11, and is attached and secured at an end to a lower end 76*b* of the suspension member 76 (strut) with a bolt 78. The lower arm 18*b* projects downward beyond the wheel hub bearing unit 11, and has an end with the socket 62 of the ball joint 60. The lower arm 18*b* changes its orientation at the end so as to extend in parallel with the axis O to reach immediately below the wheel hub bearing unit 11. Thus, the position of the socket 62 in the axis-O direction overlaps the position of the stationary shaft 15 in the axis-O direction. As shown in FIG. 6, the carrier 18 has an edge part shaped into an arc 18*t* that matches the shape of the outer circumferential surface of the motor unit 21. The concave arc 18*t* receives the motor casing 25. Therefore, the motor unit 21 does not interfere with the carrier 18.

The ball 61*b* serves as a linkage point between the in-wheel motor drive device 10 and suspension device 70, that permits them to rotatably move in any direction. A straight line extending vertically through the upper end of the suspension member 76 (strut) and the ball 61*b* is a kingpin axis K of the road wheel W and in-wheel motor drive device 10.

In the in-wheel motor drive device 10 according to the embodiment, the back part 43*b*, which is a casing wall part of the main casing 43, covers the axially inner end of the wheel hub bearing unit 11. In addition, the back part 43*b* covers an axially outer end of the motor unit 21 in the axis-O direction, and is interposed between the motor unit 21 and wheel hub bearing unit 11. The axially inner end face 15*n* of the stationary shaft 15 is secured to the axially outer wall face 43*bm* of the back part 43*b*. The carrier 18 is disposed on the inner side in the axis-O direction relative to the wheel hub bearing unit 11 and secured to the back part 43*b*. With respect to the back part 43*b* of the main casing 43, the wheel hub bearing unit 11 is disposed on the outer side in the axis-O direction, while the motor unit 21 is disposed on the inner side in the axis-O direction. Therefore, as shown in FIG. 4, the offset distance Ds from the axis O of the wheel hub bearing unit 11 to the axis M of the motor unit 21, and the distance from the axis O of the wheel hub bearing unit 11 to the outer circumferential surface of the motor unit 21 can be reduced, thereby making it possible to increase the radial dimension of the motor unit 21 compared with conventional products. In addition, the dimension Dm of a part of the motor unit 21 protruding over the main casing 43 can be reduced, thereby preventing interference between the road wheel W and motor unit 21. According to the present embodiment, the radius of the road wheel W can be reduced, and the unsprung-weight of the suspension device 70 can be reduced.

Furthermore, the in-wheel motor drive device according to the embodiment has the rolling bearing 46 that rotatably supports the output shaft 41 of the speed reduction unit 31, in addition to the wheel hub bearing unit 11, thereby stably supporting the output shaft 41 without displacement and improving the durability and reliability of the speed reduction unit 31.

Figure 7:
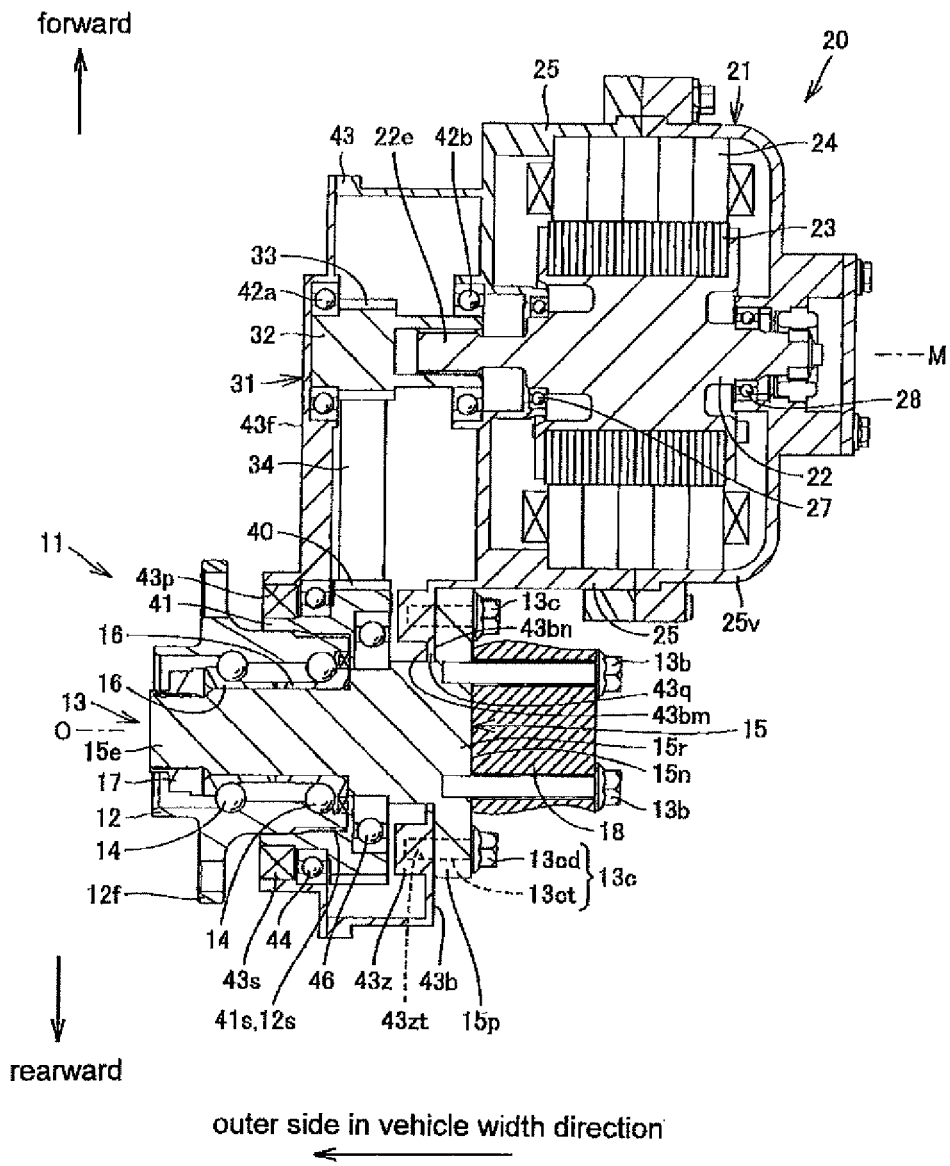
FIG. 7 is a vertical cross-sectional view of an in-wheel motor drive device of a reference example.

For providing a clear understanding of the embodiment, a reference example will be given and described. FIG. 7 is a vertical cross-sectional view of an in-wheel motor drive device 20 of the reference example. In the reference example, components common with those in the above-described embodiment are marked with the same numerals and symbols and will not be further explained, but different components will be described below. In the reference example, the root portion 15*r* of the stationary shaft 15 is coupled to the back part 43*b*; however, the stationary shaft 15 is inserted into an opening 43*q* of the back part 43*b* from the inner side in the axis-O direction, and projects toward the outer side in the axis-O direction. The root portion 15*r* is situated on the inner side in the axis-O direction relative to the back part 43*b*, and is secured to an axially inner wall face 43*bn* of the back part 43*b* in the axis-O direction. The carrier 18 is secured to the axially inner end face 15*n* of the root portion 15*r* in the axis-O direction with bolts 13*b*. Similar to the bolts 13*b* shown in FIG. 5, the bolts 13*b* in FIG. 7 also have a head at the inner side thereof in the vehicle width direction and a shank at the outer side thereof in the vehicle width direction. The bolts 13*b* are inserted into through holes formed in the carrier 18 from the inner side in the vehicle width direction, and are threadedly engaged with female threads cut in axially inner end face 15*n*. FIG. 7 omits individual teeth along the outer circumference of the intermediate gear 34.

According to the reference example shown in FIG. 7, with respect to the back part 43*b* of the main casing 43, the wheel hub bearing unit 11 is disposed on the outer side in the axis-O direction, while the motor unit 21 is disposed on the inner side in the axis-O direction; however, the root portion 15*r* of the stationary shaft 15 of the wheel hub bearing unit 11 and motor unit 21 are disposed on the same side in axis-O direction with respect to the back part 43b. Therefore, the motor unit 21 needs to be disposed away from the root portion 15r in order to prevent the root portion 15r from overlapping the motor unit 21 when viewed in the axis-O direction. This causes an increase in the offset distance from the axis O to the motor unit 21, and resultantly the radius of the motor unit 21 cannot be enlarged.

Returning to the first embodiment, as shown in FIG. 4, the stationary shaft 15 and motor unit 21 are disposed so as to overlap each other when viewed in the axis-O direction of the wheel hub bearing unit 11, thereby shortening more and more the distance from the axis O of the wheel hub bearing unit 11 to the outer circumferential surface of the motor unit 21, and therefore the radial dimension of the motor unit 21 can be increased irrespective of the presence of the wheel hub bearing unit 11.

According to the first embodiment, as shown in FIG. 3, the projecting portion 15p projecting radially outward is provided on the axially inner end of the stationary shaft 15 in the axis-O direction, and is secured to the axially outer wall face 43bm of the back part 43b. Thus, the stationary shaft 15 has the top portion 15e at the axially outer end and the thick root portion 15r at the axially inner end, and the root portion 15r that is made thicker can robustly support the stationary shaft 15 at the root.

The projecting portion 15p according to the embodiment is secured to the back part 43b by inserting the bolts 13c, which have a head 13cd on the axially outer side thereof in the axis-O direction and a shank 13ct on the axially inner side thereof in the axis-O direction, through the projecting portion 15p and threadedly engaging the shank 13ct with the back part 43b. Thus, in an assembly process for manufacturing the in-wheel motor driving device 10, workers can attach and secure the stationary shaft 15 to the back part 43b from the outer side in the axis-O direction. Therefore, the stationary shaft 15 can be attached to the back part 43b without space constraints caused by the presence of the motor unit 21. In addition, the workers can perform attachment and securing operations without concern about the presence or absence of the motor unit 21 situated on the inner side in axis-O direction.

According to the embodiment, since the outer ring 12 and output shaft 41 are spline-coupled, the outer ring 12 and output shaft 41 are coupled in a non-relative-rotation manner, while the outer ring 12 and output shaft 41 are permitted to move somewhat relatively in the direction of the axis O and/or in the direction perpendicular to the axis O. Even if an external force is exerted from the road wheel W and displaces the outer ring 12, the output shaft 41 is not displaced, and therefore the reliability of the speed reduction unit 31 is improved.

Figure 8:
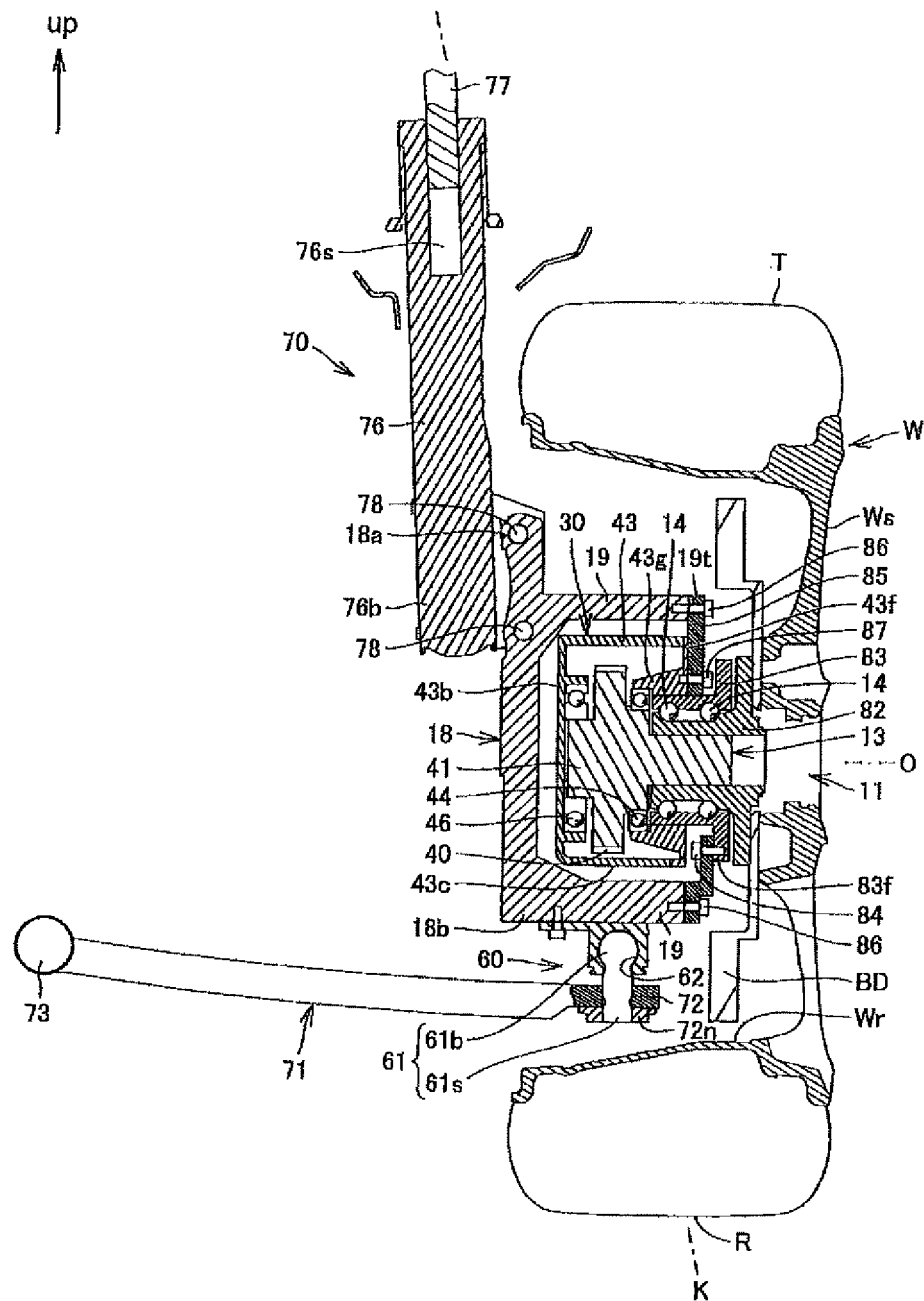
FIG. 8 is a cross-sectional view of an in-wheel motor drive device according to the second embodiment of the present invention.

Next, the second embodiment of the present invention will be described. FIG. 8 is a vertical cross-sectional view showing the second embodiment of the present invention. In the second embodiment, components common with those in the above-described embodiment are marked with the same numerals and symbols and will not be further explained, but different components will be described below. In the second embodiment, the wheel hub bearing unit 11 is configured to have a rotatable inner ring and a fixed outer ring. The wheel hub bearing unit 11 of the second embodiment is different in this point from the above-described wheel hub bearing unit 11 including a fixed inner ring and a rotatable outer ring.

The wheel hub bearing unit 11 of the second embodiment includes a rotary inner ring 82, a stationary outer ring 83, a plurality of rolling elements 14 arranged in an annular space between those rings, and a hub attachment 85. It should be noted that the in-wheel motor drive device 30 of the second embodiment includes a motor unit 21 and a speed reduction unit 31 configured the same as those in FIG. 1 however, the motor unit 21 and a speed reduction unit 31 are not presented in FIG. 8 because they are offset away from the axis O. The output shaft 41 of the speed reduction unit 31 is a shaft component, and an axially outer region of the output shaft 41 in the axis-O direction is inserted into the center bore of the rotary inner ring 82, and the output shaft 41 and the rotary inner ring 82 are spline-fitted to each other.

The stationary outer ring 83 has a flange 83f formed at the axially outer end thereof. The hub attachment 85 is attached and secured to the flange 83f with a bolt 84. The hub attachment 85 has a through hole through which the bolt 84 passes. The bolt 84 extending in parallel with the axis O has a head oriented inward in the axis-O direction (inboard side) and a shaft oriented outward in the axis-O direction (outboard side), and passes through the hub attachment 85, and an end region of the shank is threadedly engaged in a female threaded hole formed in the flange 83f.

The hub attachment 85 is a plate member having a center bore that receives the stationary outer ring 83, and is provided to expand the stationary outer ring 83 radially outward. The aforementioned bolt 84 passes through a near-inner-edge part of the hub attachment 85. The hub attachment 85 has a through hole near the outer edge through which a bolt 86 passes. The hub attachment 85 is attached and secured to a carrier, which will be described later, with the bolt 86.

The outer circumferential surface of the stationary outer ring 83 is supported by the inner circumferential surface of an annular wall 43g of the main casing 43. The annular wall 43g is provided to stand on an inner (the inner side in the axis-O direction) wall face of the front part 43f, and projects inward in the axis-O direction. An output shaft 41 is received in the center bore of the annular wall 43g, and a rolling bearing 44 is provided between an inner circumference of an axially inner end of the annular wall 43g in the axis-O direction, and the outer circumference of the output shaft 41.

Regarding the main casing 43, an annular wall 43d is provided to stand on an inner (the outer side in the axis-O direction) wall face of the back part 43b, and projects outward in the axis-O direction. A rolling bearing 46 is provided between an inner circumference of the annular wall 43d and an outer circumference of an axially inner end of the output shaft 41 in the axis-O direction. Thus, the output shaft 41 and output gear 40 are supported at both ends by the rolling bearings 44, 46. However, the rolling bearings 44, 46 are disposed on the inner side in the axis-O direction relative to the stationary outer ring 83.

The carrier 18 has an upper arm 18a extending upward and a lower arm 18b extending downward as shown in FIG. 8. The upper arm 18a projects upward beyond the main casing 43, and is attached and secured to a lower end 76b of the suspension member 76 (strut) with a bolt 78. The lower arm 18b projects downward beyond the main casing 43, and has an end with a socket 62 of a ball joint 60. The lower arm 18b changes its orientation at the end so as to extend in parallel with the axis O to reach immediately below the wheel hub bearing unit 11. Thus, the position of the socket 62 in the axis-O direction overlaps the position of the stationary shaft 15 in the axis-O direction. As shown in FIG. 6, the carrier 18 has an edge part shaped into an arc 18t that matches the shape of the outer circumferential surface of the motor unit 21. The concave arc 18t receives the motor casing 25. Therefore, the motor unit 21 does not interfere with the carrier 18.

Returning to FIG. 8, the carrier 18 has a plurality of extended parts 19. When the upper arm 18a and lower arm 18b are regarded as a main body of the carrier, the carrier body is disposed on the inner side in the axis-O direction relative to the wheel hub bearing unit 11, and the extended part 19 extends from the carrier body in the axis-O direction. The positions of the extended parts 19 in the axis-O direction overlap the positions of the main casing 43, output gear 40, rotary inner ring 82, stationary outer ring 83, and second-row rolling elements 14 in the axis-O direction.

One of the extended parts 19 separately extends from the upper arm 18a. The other extended part 19 continuously extends from an end of the lower arm 18b. Each of the extended parts 19 has an end having a female threaded hole with which a bolt 86 is threadedly engaged. The bolt 86 extending in parallel with the axis O has a head oriented outward in the axis-O direction and a shaft oriented inward in the axis-O direction, and passes through the hub attachment 85. An end region of the shank is threadedly engaged in the female threaded hole formed in the extended part 19. The carrier 18, hub attachment 85, and stationary outer ring 83 are arranged in series in this order and securely coupled to one another with the bolts 84, 86.

The extended parts 19 have end faces 19t abutting against an axially inner face of the hub attachment 85 in the axis-O direction. The end faces 19t are flush with each other. In terms of positions in the axis-O direction, the positions of the end faces 19t in the axis-O direction overlap the position of the front part 43f in the axis-O direction, or, although it is not illustrated, are separated to the axially inner side relative to the position of the front part 43f in the axis-O direction. In addition, the positions of the end faces 19t in the axis-O direction overlap the position of the stationary outer ring 83 in the axis-O direction.

The hub attachment 85 has a through hole on the radially inner side thereof, and a bolt 87 passes through the through hole. The front part 43f has a female threaded hole with which the bolt 87 is threadedly engaged. The female threaded hole is formed in a thick wall part of the annular wall 43g. The bolt 87 extending in parallel with the axis O has a head oriented outward in the axis-O direction and a shaft oriented inward in the axis-O direction, and passes through the hub attachment 85. An end region of the shank is threadedly engaged in a female threaded hole formed in the main casing 43. The carrier 18, hub attachment 85, and main casing 43 are arranged in series in this order and securely coupled to one another with the bolts 86, 87.

Also in the second embodiment shown in FIG. 8, the motor unit, which is not illustrated, is disposed adjacent to the stationary outer ring 83 to make the offset distance from the axis O to the axis of the motor unit shorter than conventional products, thereby shortening the distance from the axis O to the stator of the motor unit in the axis-O direction while ensuring a sufficiently long outer diameter of the stator. This point should be understood by reading the stationary shaft 15 as the stationary outer ring 83 with reference to FIG. 4. Thus, the second embodiment can provide a motor having a sufficient radial dimension to ensure driving torque.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents. Although the embodiments have indicated the strut-type suspension device 70 as an example, the suspension device used to link the in-wheel motor driving device 10 to the vehicle body is not limited to the strut-type suspension device. The speed reduction unit 31 in the above-described embodiments is a parallel four-shaft gear reducer; however, the number of the parallel shafts is not limited to four, and the speed reduction unit 31 can be a parallel double-shaft gear reducer or a parallel triple-shaft gear reducer in other embodiments that are not illustrated.

INDUSTRIAL APPLICABILITY

The in-wheel motor drive device according to the present invention is advantageously used in electric vehicles and hybrid vehicles.

REFERENCE SIGNS LIST 10 in-wheel motor drive device
11 wheel hub bearing unit
12 outer ring
12f flange
12s spline groove
13 inner stationary member
13b, 13c, 78 bolt
14 rolling element
15 stationary shaft
15p projecting portion
15r root portion
16 inner race
18 carrier
21 motor unit
22 motor rotary shaft
25 motor casing
25v motor casing cover
44 rolling bearing (output-shaft bearing)
31 speed reduction unit
32 input shaft
33 input gear
34, 36, 37, 39 intermediate gear
35, 38 intermediate shaft
40 output gear
41 output shaft
41s spline groove
43 main casing
43b back part (casing wall part)
43bm axially outer wall face
43bn axially inner wall face
43c lower part
43f front part
43p, 43q opening
43z coupling seat
47 oil tank
51 pump shaft
53 pump gear
54 oil pump
60 ball joint
61 ball stud
61b ball
61s stud
62 socket
70 suspension device
71, 76 suspension member
72 outer end in the vehicle width direction
73 inner end in the vehicle width direction
76b lower end
76s shock absorber
77 upper end region BD brake rotor
82 rotary inner ring
83 stationary outer ring
85 hub attachment
K kingpin axis
M, Nf, Nl, O, P axis
S space
T tire
W wheel
Wr rim
Ws spoke section

The invention claimed is:

1. An in-wheel motor drive device comprising:
a motor unit; a wheel hub bearing unit; a speed reduction unit that reduces the rotational speed of the motor unit and transmits the reduced rotational speed to the wheel hub bearing unit; and a carrier that is linked to a vehicle body member, wherein
the wheel hub bearing unit includes an outer ring disposed on an axially outer side of the wheel hub bearing and coupled to a wheel, a stationary shaft passing through a center bore of the outer ring, and a plurality of rolling elements arranged in an annular space between the outer ring and the stationary shaft, wherein the stationary shaft is not rotational at any condition,
the motor unit and the speed reduction unit are disposed to offset from an axis of the wheel hub bearing unit in a direction perpendicular to the axis,
the motor unit is disposed adjacent to an axially inner end portion of the stationary shaft,
the speed reduction unit includes an output gear coupled to the outer ring, and a rolling bearing provided between the output gear and the stationary shaft to rotatably support the output gear, and
the carrier is disposed on an axially inner side relative to the wheel hub bearing unit, and secured to the axially inner end portion of the stationary shaft.

2. The in-wheel motor drive device according to claim 1, wherein
the speed reduction unit includes a casing wall part that is disposed on the axially inner side relative to the wheel hub bearing unit, and is coupled to the axially inner end portion of the stationary shaft.

3. The in-wheel motor drive device according to claim 2, wherein
the stationary shaft includes a projecting portion at the axially inner end portion thereof, the projecting portion projecting radially outward relative to an axially outer end portion of the stationary shaft, and the projecting portion and the motor unit are disposed to overlap each other when viewed in the direction of the axis of the wheel hub bearing unit.

4. The in-wheel motor drive device according to claim 3, wherein
the projecting portion is secured to an axially outer wall face of the casing wall part.

5. The in-wheel motor drive device according to claim 4, wherein
the carrier is secured to an axially inner wall face of the casing wall part.

6. The in-wheel motor drive device according to claim 4, wherein
the wheel hub bearing unit further includes a bolt having a head oriented outward in the direction of the axis and a shank oriented inward in the direction of the axis, and
the shank of the bolt passes through the projecting portion, and is threadedly engaged in a female threaded hole provided in the casing wall part.

7. An in-wheel motor drive device comprising:
a motor unit; a wheel hub bearing unit; a speed reduction unit that reduces the rotational speed of the motor unit and transmits the reduced rotational speed to the wheel hub bearing unit; and a carrier that is linked to a vehicle body member, wherein
the wheel hub bearing unit includes a rotary inner ring disposed on an axially outer side and coupled to a wheel, a stationary outer ring disposed radially outside the rotary inner ring and disposed coaxially with the rotary inner ring, and a plurality of rolling elements arranged in an annular space between the stationary outer ring and the rotary inner ring,
the motor unit and the speed reduction unit are disposed to offset from an axis of the wheel hub bearing unit in a direction perpendicular to the axis, and
the carrier includes a carrier body that is disposed on an axially inner side relative to the wheel hub bearing unit, and an extended part extending from the carrier body toward an axially outer side, and is secured to the stationary outer ring with the extended part, the carrier being separate from a case of the speed reduction unit and the motor unit.

8. The in-wheel motor drive device according to claim 7, wherein
the wheel hub bearing unit includes a hub attachment that is coupled to the outer ring and expands radially outward relative to the outer ring, and
the extended part of the carrier is attached and secured to the hub attachment.

\* \* \* \* \*